April 13, 1926.

C. W. McCALLUM 1,580,515

SPOTLIGHT FOR MOTOR VEHICLES

Filed July 21, 1924

INVENTOR
Charles. W. McCallum
BY
Clayton E. Wyrick.
ATTORNEY

Patented Apr. 13, 1926.

1,580,515

UNITED STATES PATENT OFFICE.

CHARLES W. McCALLUM, OF DETROIT, MICHIGAN.

SPOTLIGHT FOR MOTOR VEHICLES.

Application filed July 21, 1924. Serial No. 727,298.

*To all whom it may concern:*

Be it known that I, CHARLES W. McCAL-LUM, a citizen of the United States, and residing at Detroit, county of Wayne, State of Michigan, have invented a new and Improved Spotlight for Motor Vehicles, of which the following is a specification.

This invention relates to spot lights for motor vehicles, and has for one of its objects the provision of a novel control mechanism for such a light.

Another object is to mount a spot light upon the cowl of a vehicle and to extend within the cowl connections for controlling the direction of said light.

Still another object is to provide independent mechanisms for angularly adjusting a spot light about horizontal and vertical axes.
A further object is to provide control shafts for effecting said angular movements, one of which is tubular and forms a housing for the other.

These and other objects will be apparent from the following description wherein reference is made to the accompanying drawings, illustrating a preferred embodiment of my invention.

Figure 1:
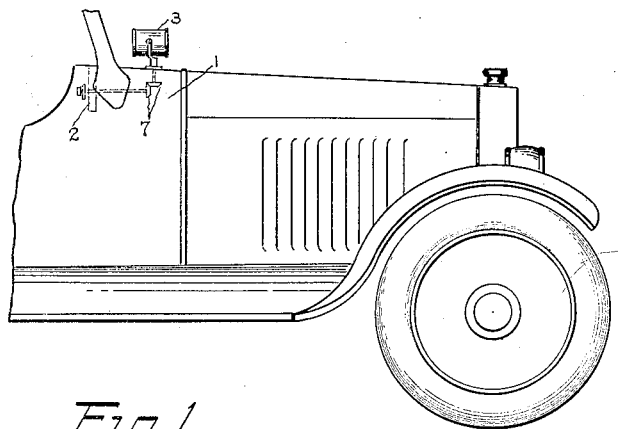
Figure 1 is a view in side elevation of the front portion of an automobile equipped with the improved spot light.
Figure 3:
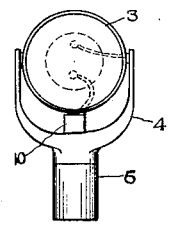
Figure 3 is a front view of the light and its mounting.
Figure 2:
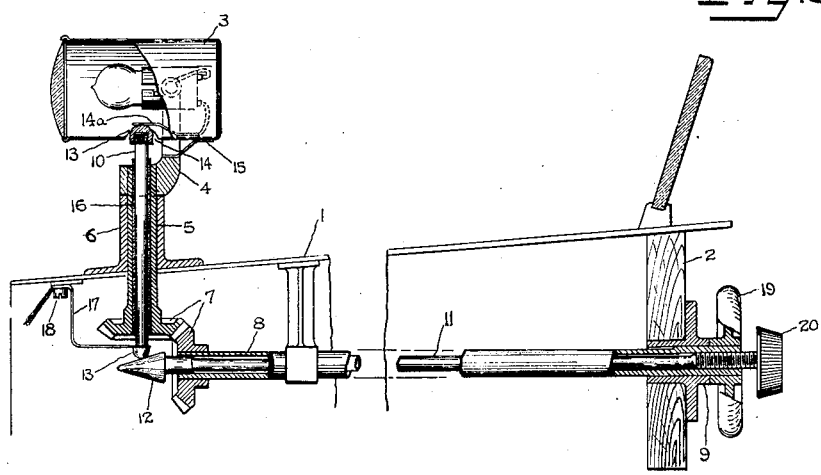
Figure 2 is a longitudinal vertical sectional view of the same.

In these views, the reference character 1 designates the cowl of an automobile and 2 the instrument board of said vehicle.

The invention mounts centrally upon said cowl a spot-light 3, pivoting the same within a yoke member 4 fast upon the upper end of a tubular shaft 5. Said shaft is vertically journaled in a bearing 6 having a flanged lower end riveted or otherwise rigidly secured to the cowl.

The lower end portion of the shaft 5 projects into the cowl 1 and is adapted to be rotatively driven through a pair of bevel gears 7 from a horizontal tubular shaft 8. The latter shaft extends rearwardly from the gears 7 and has its rear end portion extended through the instrument board 2 and journaled in a bearing 9 mounted fast upon the instrument face of said board.

Vertical and horizontal rods 10 and 11 are arranged within the shafts 5 and 8, the forward end of the rod 11 carrying a conical control element 12, and the rod 10 being provided with hemispherical heads 13 upon its ends, the lower of which rests upon the control element 12. The upper end portion of the rod 10 projects slightly through an opening 14 in the bottom of the spotlight casing and engages a leaf spring electrical contact 14ª interiorly carried by and insulated from the casing (see Fig. 1).

It is to be noted that the rod 10 engages the contact member 14ª slightly in advance of the vertical plane of the pivotal axis of the casing.

To the yoke member 4, between the arms thereof, one end of a leaf spring 15 is secured, the other end of said spring bearing upon the rear end of the spot-light and exerting an upward effort upon the same. The rotational response of the spot-light to this effort holds the spot-light casing pressed firmly down upon the upper head of the rod 10.

An insulating sleeve 16 surrounds the rod 10 within the shaft 5 and the lower head 13 is also of insulating material. Thus said rod is adapted to form a conductor for supplying electrical energy to the bulb of the spot-light, the current being supplied to said conductor through a suitable connection 17 from a binding post 18 interiorly mounted under the cowl. The other electrical connection for the spot-light bulb may be a grounded one established through the yoke member 4 and shaft 5.

On the driver's side of the instrument board, the shaft 8 and the rod 11 respectively carry a hand wheel 19 and a control knob 20, and a portion of said rod adjacent to said knob has screw-threaded engagement with the shaft 8.

In the use of the described invention, when it is desired to swing the spot-light about a vertical axis, the hand wheel 19 is turned, its rotation being communicated through the shaft 8, gears 7, shaft 5, and yoke 4 to the spot-light. The degree and direction of actuation of said hand-wheel control the degree of angular movement of the spotlight and the direction of such movement. When the shaft 8 is thus rotated, the rod 11 turns freely therewith.

When it is desired to tilt the spot-light to raise or lower the direction of its rays, the knob 20 is turned, the hand-wheel 19 being held stationary. Owing to the screw-threaded engagement of the parts 8 and 11, there results a forward or rearward feeding of the rod 11, causing the rod 10 to either mount or descend the incline of the conical member 12. Thus said rod, by its engagement with the contact and abutment member 14ª either swings the spot-light upwardly or permits the same to swing down.

From the foregoing description it becomes evident that the device is very simple and efficient in operation, will not easily get out of order and provides a device which accomplishes the objects described.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having thus described my invention I claim:

1. In a device of the character described, the combination with a spot-light, and a mounting for the same, the light being pivoted to swing about a horizontal axis established by said mounting, of a substantially vertical rod engaging the spot-light beneath the latter at a point to one side of the vertical plane of said horizontal axis, a circuit for the spot-light, including said rod means yieldably urging swinging of the spot-light about said horizontal axis, and maintaining mechanical and electrical contact thereof with said rod, and means for adjusting said rod vertically to tilt the spot-light about said horizontal axis.

2. In a device of the character described, the combination with a spot-light, and a mounting for the same, the light being pivoted to swing about a horizontal axis established by said mounting, of a substantially vertical stem engaging the spot-light beneath the latter at a point to one side of the vertical plane of said horizontal axis, means yieldably urging swinging of the spot-light about said horizontal axis, and maintaining contact thereof with said rod, and means for adjusting said rod vertically to tilt the spot-light about said horizontal axis, and means for establishing electrical connections to said rod and from said rod to the bulb of the spot-light.

3. In a device of the character described, the combination with a mounting, and a substantially vertical tubular shaft carrying said mounting, of a spot-light pivoted upon said mounting to swing about a horizontal axis, a rod mounted within said hollow shaft and vertically slidable and having supporting engagement with the spot light at one side of the vertical plane of said horizontal axis, a conical member supporting the lower end of said rod, a stem carrying said conical member and horizontally adjustable to adjust said rod vertically and tilt the spot-light, and means for rotating said hollow vertical shaft to swing the spot light about a vertical axis.

4. In a device of the character described, the combination with the casing of a spot light and means pivotally mounting said casing to turn upon a substantially horizontal axis, of an operating member mounted below said casing and having a portion projecting into the casing, said member being movable to swing said casing on said horizontal axis, an electric circuit for the spot light including said member, and a contact member within the casing bearing upon said member receiving the thrust of said member and establishing an electrical connection to said member.

In witness whereof I hereunto set my hand.

CHARLES W. McCALLUM.